United States Patent

Tominaga et al.

[11] Patent Number: 6,032,366
[45] Date of Patent: Mar. 7, 2000

[54] PORTABLE STRIPPING UNIT

[75] Inventors: Tomoya Tominaga; Hiroki Hada; Isamu Akatsuka; Jun Narukawa, all of Yokkaichi, Japan

[73] Assignee: Sumitomo Wiring Systems, Ltd., Yokkaichi, Japan

[21] Appl. No.: 08/896,271

[22] Filed: Jul. 15, 1997

[30] Foreign Application Priority Data

Aug. 9, 1996 [JP] Japan .................................. 8-211521

[51] Int. Cl.⁷ ................................................ H02G 1/12
[52] U.S. Cl. ............................... 30/90.1; 81/9.51; 83/947
[58] Field of Search ............................ 83/452, 460, 461, 83/861, 947; 81/9.51, 9.41, 9.42, 9.43; 30/90.1

[56] References Cited

U.S. PATENT DOCUMENTS

| | | | |
|---|---|---|---|
| 3,154,980 | 11/1964 | Hayden et al. | 81/9.51 |
| 3,563,117 | 2/1971 | Bolssens | 30/90.1 |
| 4,364,289 | 12/1982 | Sorensen | 81/9.51 |
| 4,879,926 | 11/1989 | Wollermann | 81/9.51 |
| 4,951,530 | 8/1990 | Cross | 81/9.51 |
| 4,981,054 | 1/1991 | Stepan | 81/9.51 |
| 5,067,379 | 11/1991 | Butler et al. | 83/947 |
| 5,074,169 | 12/1991 | Matz | 81/9.51 |
| 5,235,735 | 8/1993 | Koch | 81/9.51 |
| 5,331,867 | 7/1994 | Carpenter et al. | 81/9.51 |
| 5,445,051 | 8/1995 | Carpenter et al. | 83/947 |
| 5,457,877 | 10/1995 | McDermontt | 83/947 |

FOREIGN PATENT DOCUMENTS 1560943  3/1969  France .

Primary Examiner—Kenneth E. Peterson
Assistant Examiner—Gyounghyun Bae
Attorney, Agent, or Firm—Greenblum & Bernstein, P.L.C.

[57] ABSTRACT

A clamping unit, cutting unit, and drive unit are installed in a main body that may be carried with one hand. The cutting depth of the cutting unit may be adjusted by an adjusting wheel. A handle unit for carrying the main body is shaped and positioned such that a covered electric wire may be raised, and the main body placed in the area under the wire without interfering with the handle unit. An insertion hook holds the covered electric wire securely before the clamping unit, cutting unit, and drive unit are driven. When the stripping unit is actuated, the clamping unit clamps an intermediate portion of the wire, then the cutting unit cuts the covering of the covered electric wire to a predetermined depth, then the drive unit pushes the cutting unit (and thereby a portion of the wire covering) away from the clamping unit. When a covered electric wire wired on a design board is clamped by the clamping unit and cut by the cutting unit, and the clamped portion and cut portion driven apart by the drive unit, intermediate stripping (i.e., in the middle of a wire) is carried out.

12 Claims, 10 Drawing Sheets

PORTABLE STRIPPING UNIT

BACKGROUND OF THE INVENTION

1. Field of the Invention

The present invention relates to a portable stripping unit, and more particularly, to a portable stripping unit for stripping an intermediate portion of a covered electric wire in a process for manufacturing a wire harness, and a subassembly or "wire assembly" which forms a wire harness.

2. Description of Relevant Materials

Generally, as part of a process for manufacturing a wire assembly, a stripping process is carried out to fashion an electric junction between electric wires.

This "intermediate" stripping process is carried out by cutting deeply into an obstructing portion of the covered electric wire, separating the cut portion, and exposing the core line. One facility known to the present inventors involves steps of fixing several covered electric wires and stripping the wires by gathering the wires to carry out the intermediate stripping process.

However, using the known facility, the covered electric wires are fixed and stripped by a comparatively large mechanism. Accordingly, covered electric wires already wired on a design board cannot be directly processed. Since the known facility can only be used to perform the intermediate stripping process on covered electric wires before the wires are wired as a web assembly, the known facility cannot process wires already part of a web assembly, nor is it portable. The known facility is therefore inefficient and heavily constrained when a variety of types and/or small quantities of wires are to be processed in modern small lot manufacturing.

SUMMARY OF THE INVENTION

An object of the present invention is to provide an portable stripping unit for performing intermediate stripping of covered electric wires after wiring.

According to one aspect of the present invention for stripping an intermediate portion of a covered electric wire, the portable stripping unit includes a main body having two frame bodies, a handle unit, a clamping unit, a cutting unit, and a driving mechanism for the frame bodies. The two frame bodies have mutually changeable relative positions, i.e., one is movable relative to the other. The handle unit is fixed to one of the frame bodies, and the portable stripping unit may be carried with one hand by the handle unit. The clamping unit is provided to one of the frame bodies, and clamps and retains the covered electric wire. The cutting unit is provided to the other frame body (i.e, not the frame body having the clamping unit) and cuts a covered part of the covered electric wire. The driving mechanism drives the two frame bodies, respectively bearing the clamping unit and the cutting unit, to separate from one another and approach one another. In this manner, intermediate stripping is carried out as the clamping unit and cutting unit are separated.

Accordingly, in the embodiment of the present invention, after a covered electric wire, already arranged to be wired on a design board, is clamped by the clamping unit and cut by the cutting unit, the intermediate stripping process is performed by driving the mobile frame body so that the clamping unit and the cutting unit are separated from one another (performing the stripping) and returned (to be ready for a subsequent operation). Consequently, the invention can operate on wires before or after wiring on a design board, and has a clear effect of benefiting modem small lot manufacturing. That is, many different types of wires may be stripped in small quantity production lots, before or after the wires are fixed on a design board.

In one particular example of the invention, the cutting unit includes a fixed member holding a first stripping blade, fixed to the same frame body as the cutting unit, a mobile member holding a second stripping blade, and a rotatable adjusting wheel. The fixed member and the mobile member have mutually changeable relative positions (i.e., one is movable relative to the other). The mobile member moves with respect to the frame body (to which the fixed member is fixed), so that the first and second stripping blades become positioned to mutually cut the covered part of the covered electric wire. The rotatable adjusting wheel is provided to one of the mobile member or the fixed member, and the position of the adjusting wheel determines an interval between the fixed member and the mobile member. Accordingly, when the mobile member is moved to position the first stripping blade and the second stripping blade to mutually cut the covered part of the covered electric wire, the adjusting wheel sets a cutting depth of the first and second stripping blades into the covered portion of the covered electric wire.

In this manner, since the cutting depth between the mobile side stripping blade and fixed side stripping blade is easily adjusted to a desired dimension, the device is suitable for general purpose use (i.e., usable on a wide variety of shapes and sizes of wire), and even more different types of wires may be stripped, and in small quantity production lots.

In another example of the present invention, the handle unit is shaped and positioned such that a covered electric wire may be raised, the main body may be placed in the area under the covered electric wire, and the covered electric wire may be set in the clamping unit and the cutting unit without interfering with the handle unit.

Since the covered electric wire W may be raised from an assembly, observed, and set while the operator holds the device in kettle-fashion with one hand, the main body may be placed in the area under the wire. Accordingly, the main body is stable, and workability is significantly enhanced.

In still another example of the present invention, the portable stripping unit further includes a positioning member and a substantially hook-shaped insertion hook. The positioning member and the insertion hook regulate the covered electric wire as the clamping unit and the cutting unit separate from one another to carry out intermediate stripping.

Consequently, once a covered electric wire is raised from an assembly and set in the device, the positioning member securely holds the wire in the insertion hook. Accordingly, the covered electric wire may be easily positioned and set even if an operator works by holding the handle unit in one hand.

In yet still another example of the present invention, the handle unit further includes a handle leg positioned above an upper surface of the main body, and a connecting portion extending from the handle leg to the main body. As a result, when at the desired location, for example, an operator may easily raise a covered electric wire from a wiring diagram board, and place the main body area under the wire.

In this case, the handle leg is optionally substantially L-shaped and substantially parallel to the upper surface of the main body. This arrangement allows the handle to be offset from the point of connection to the main body, and the handle may therefore be positioned at the proper balance point even if operative elements borne by the main body obstruct some possible connection points.

BRIEF DESCRIPTION OF THE DRAWINGS

The present invention is further explained in the following description with reference to the drawings, illustrating, by way of non-limiting examples, various embodiments of the invention, with like reference numbers representing similar parts, and wherein.

DETAILED DESCRIPTION OF THE PREFERRED EMBODIMENTS

Figure 1:
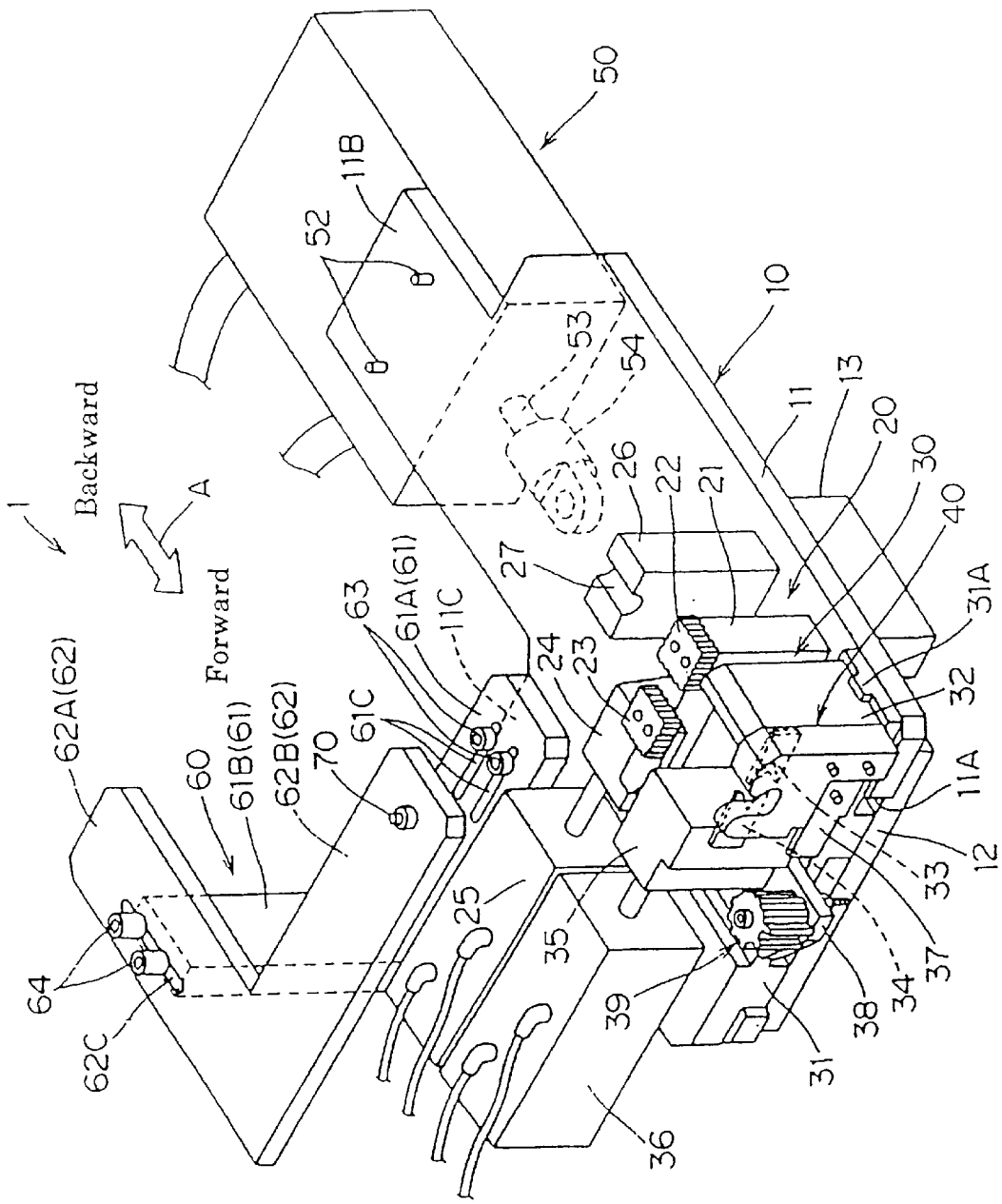
FIG. 1 is a perspective view of an portable stripping unit according to one embodiment of the invention, showing one embodiment.
Figure 2:
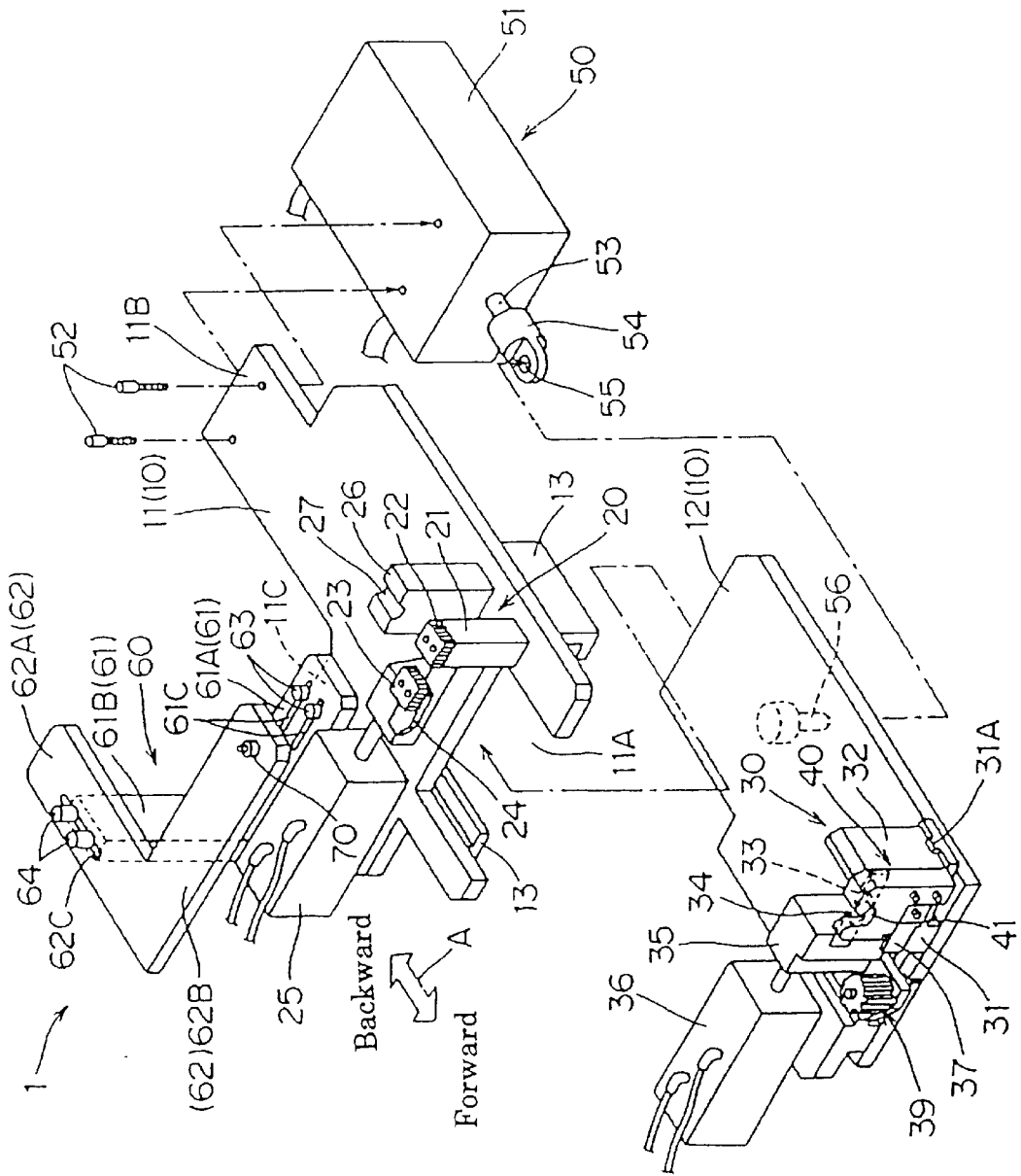
FIG. 2 is an exploded view of the portable stripping unit of FIG. 1.

FIG. 1 is a perspective view of an portable stripping unit 1 according to one embodiment of the invention, showing one embodiment. FIG. 2 is an exploded view of the portable stripping unit 1 of FIG. 1.

Referring to FIG. 1, the portable stripping unit 1 in the embodiment shown includes a main body 10. The main body 10 includes a fixed frame body 11 (formed from a metal plate), and a mobile frame body 12. The fixed frame body 11 holds a clamping unit 20, and the mobile frame body 12 holds a cutting unit 30. The cutting unit 30 further holds a positioning member 40. The main body 10 further includes an air cylinder 50 as a driving portion, and a handle unit 60 to hold the main body 10.

A pair of rail members 13 provided on the lower face of the fixed frame body 11 of the main body 10 support and guide the mobile frame body 12 to be movable back and forth in forward and backward directions as shown in FIG. 1, i.e., in the directions shown by the arrow A in FIG. 1.

The fixed frame body 11 is formed with an recessed portion 11A ("concave" portion) at the forward side of the fixed frame body 11, an extending portion 11B ("convex" portion) extending from the backward side of the fixed frame body 11, and an extending portion 11C ("convex" portion) extending from the handle side (i.e., the side opposite the mobile frame body 12) along the forward-backward length of the fixed frame body 11. The clamping unit 20 for clamping a covered electric wire W (shown in FIG. 5) is mounted to the fixed frame body 11 near the recessed portion 11A.

The clamping unit 20 includes a fixed clamping stand 21 mounted near the recessed portion 11A, and a fixed clamp 22 secured by a screw to the fixed clamping stand 21. Moreover, a mobile clamp 23 arranged in the width direction of the fixed frame body 11 is supported by a clamping holder 24 to contact the fixed clamp 22. The clamping unit 20 also includes an air cylinder 25 for moving the clamp holder 24 in the width direction of the fixed frame body 11. An electric wire guiding block 26, supported by the fixed frame body, stands upright toward the rear (backward direction) of the fixed clamp stand 21. A concave or V-shaped guide groove 27 is formed in the upper end of the electric wire guiding block 26. A covered electric wire W is positioned by the electric wire guiding block 26 by guiding the wire W to run along the guide groove 27.

The clamping unit 20 is designed to clamp a covered electric wire W (extending in the frontward-backward direction of the main body 11) between the fixed clamp 22 and mobile clamp 23 by driving the air cylinder 25 according to predetermined timing (described later).

The cutting unit 30 includes a rail pedestal 31 on the upper face of the mobile frame body 12 near the forward side of the mobile frame body 12, and having a rectangular guide rail 31A extending in the width direction. The rail pedestal 31 extends through the recessed portion 11A of the fixed frame body 11, and above the fixed frame body 11 toward both sides in the width direction. The cutting unit 30 also includes a fixed blade block 32, which is detachably mounted, via a rectangular notch formed on the lower side of the fixed blade block 32, to the rectangular guide rail 31A of the rail pedestal 31, standing upright at one end side of the width direction of the top of the rail pedestal 31. The fixed blade block 32 holds a fixed side stripping blade 33 having a V-shaped cutting edge opening toward the opposite side of the mobile frame body 12 in the width direction, and the fixed blade block 32 acts as a supporting assembly for the fixed side stripping unit.

Still further, the cutting unit 30 includes a mobile blade holder 35, which is slidably supported and fitted on the rectangular guide rail 31A of the pedestal 31. The mobile blade holder 35 is slidably supported and fitted on the rectangular guide rail 31A of the rail pedestal 31 via an extender plate 38, extending forward from the bottom of the mobile blade holder 35, having a rectangular notch (not shown) formed on the lower side of the extender plate 38. An air cylinder 36 is connected to the mobile blade holder 35, and can move the mobile blade holder 34 back and forth in the width direction along the rectangular guide rail 31A. The mobile blade holder 35 further holds a mobile side stripping blade 34 having a V-shaped cutting edge opening toward the cutting edge of the fixed side stripping blade 33, and the mobile blade holder 35 acts as a supporting assembly for the mobile side stripping blade. The mobile blade holder 35 and mobile side stripping blade 34 are movable between a home position (shown in FIG. 4) and stripping positions (shown in FIGS. 7 and 8).

A conventional covered electric wire W designed to be stripped may be clamped with the clamping unit 30 and nipped between the opposing mobile side stripping blade 34 and fixed side stripping blade 33 by driving the air cylinder 35 according to predetermined timing (described later). The mobile side stripping blade 34 notches the covered part of a covered electric wire W in cooperation with the fixed side stripping blade 33, i.e., the stripping blades 33 and 34 mutually cut the covered part of the covered electric wire W.

Figure 3:
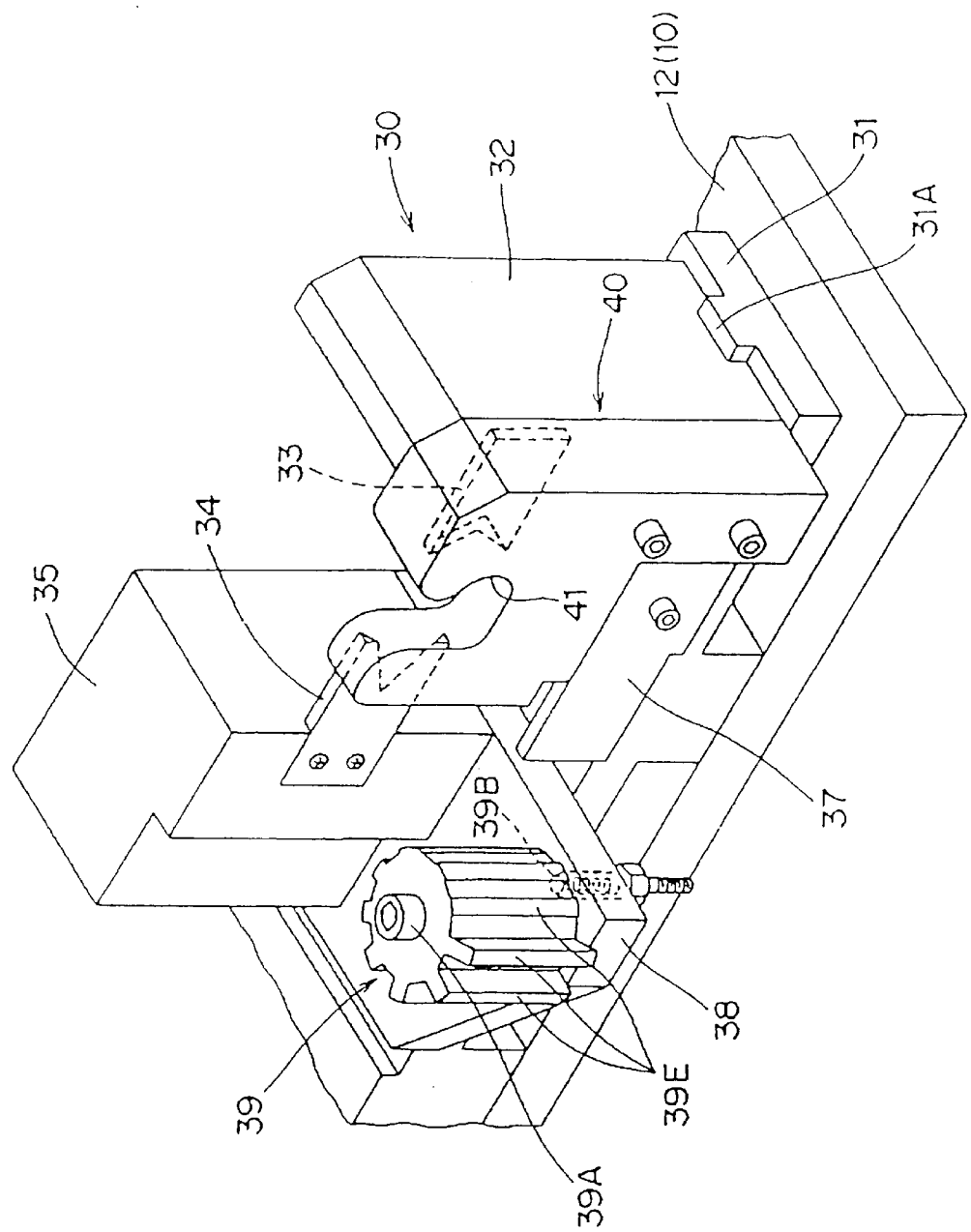
FIG. 3 is a magnified perspective view of a cutting unit of the portable stripping unit of FIG. 1 in the same embodiment.

FIG. 3 is a magnified perspective view of the cutting unit 30, showing the same embodiment as FIG. 1. As shown in FIG. 3, a positioning member 40 is mounted to the forward side of the fixed blade block 32. A protruding plate 37 is mounted to the forward side of the positioning member 40, and extends in the width direction toward the mobile blade holder side of the mobile frame body 12.

An adjusting wheel 39 (adjusting top), facing the protruding plate 37 in the width direction, is rotatably supported on the top of the extender plate 38. The adjusting wheel 39 is supported by a bolt 39A to be rotatable about a vertical axis of the bolt 39A and contactable to the protruding plate 37. A conventional ball plunger 39B is mounted in the extender plate 38 facing a lower surface of the adjusting wheel 39, the adjusting wheel 39 having detent notches formed therein, so that rotation of the adjusting wheel 39 may be regulated and the adjusting wheel 39 may be click-stopped at predetermined angular positions.

Several (a plurality) projections 39E project in the radial direction and extend in the axial direction of the adjusting wheel 39, each at a predetermined angular position and projecting from the surrounding face of the adjusting wheel 39. That is, for each predetermined angular position, one projection 39E projects from the adjusting wheel 39 to face the protruding plate 37, and may be contacted to the projecting plate 37. The outer surface of each projection 39E differs in radial distance from the axis of the bolt 39A (i.e., from the center of the wheel 39), the radial distance increasing as one progresses around the surrounding face of the adjusting wheel.

Accordingly, the adjusting wheel 39 may be rotated between predetermined angular positions to change a designated projection 39E of the adjusting wheel 39 facing the protruding plate 37, thereby changing the position at which the adjusting wheel 39 contacts the protruding plate 39. In this manner, since the mobile blade holder is integrated with the extender plate, the interval between the mobile stripping blade 34 and the fixed stripping blade 33 may be adjustably determined and set according to the position of the adjusting wheel 39, thereby setting the stripping of the covered electric wire W by the stripping blades 33 and 34. It should be noted that the adjusting wheel may alternatively be provided to the fixed blade block 32 and the protruding plate 37 to the mobile blade holder 35.

The positioning member 40 has a substantially hook-shaped insertion hook 41 formed therein, having a hook recess for holding a covered electric wire W to be clamped by the clamping unit 20. The insertion hook 41, hooked in toward the handle unit 60, sets a covered electric wire W on the clamping unit 20 and cutting unit 30 by positioning the covered electric wire W when the wire W is introduced in the hook recess toward the side of the fixed stripping blade 33. Simultaneously, since the insertion hook 41 regulates the position of the covered electric wire W so that once the wire W is set, the wire W cannot be accidentally or easily removed. That is, the positioning member 40 and insertion hook 41 regulate the covered electric wire W as the clamping unit 20 and the cutting unit 30 separate from one another to carry out intermediate stripping.

As shown in FIG. 2, the air cylinder 50 includes a cylinder 51, a plunger rod 53 extendable from the cylinder 51, and an installation member 54 having an installation hole 55 formed therein at the tip of the plunger rod 53. The air cylinder 50 is secured to the lower face of the rear (backward) end of the fixed frame body 11 by means of bolts 52. As previously noted, the mobile frame body 12 is movable in the forward and backward directions with respect to the fixed fame body 11. The installation member 54 of the air cylinder 50 is secured to the mobile frame body 12 via a connecting rod 56 extending downward from the lower face of the mobile frame body 12 into the installation hole 55 of the installation member 54. Consequently, the mobile frame body 12 can be moved by the air cylinder 50 in the forward and rearward directions.

The handle unit 60 includes an L-shaped lifter/installation frame 61 (having a horizontal leg plate 61A and a vertical leg plate 61B) attached to the top side of the extending portion 11C of the fixed frame body 11, and an L-shaped handle arm 62 (having a connecting/installation leg plate 62A and a handle leg 62B) attached to the top of the vertical (vertically extending) leg plate 61B of the lifter frame 61. The horizontal leg plate 61A of the lifter frame 61 extends in the width direction of the fixed frame body 11 and along the extending portion 11C, while the vertical leg plate 61B extends upward (i.e., is bent up a right angle from) an end of the horizontal leg plate 61A. Further, the horizontal leg plate 61A has grooves 61C, extending in the width direction, formed at the fixed frame body 11 side, and is secured to the extending portion 11C via bolts 63 passing through the grooves 61C. Accordingly, the installed position of the entire handle unit 60 can be changed in the width direction by means of the bolts 63 and grooves 61C. The handle leg 62b of the handle unit 60 is substantially parallel to the upper surface of the main body 10, while the vertical leg plate 61b connects the handle leg 62b to the main body 10.

The connecting leg plate 62A of the handle arm 62 is a metal plate extending in the frontward-backward direction, while the handle leg 62B extends in the width direction (i.e., is bent in the width direction at a right angle) from an end of the connecting leg plate 62A. Further, the connecting leg plate 62A has a groove 62C, extending in the frontward-backward direction, formed at the vertical leg plate 61B side, and is secured to the vertical leg plate 61B via bolts 64 passing through the groove 62C. Accordingly, the installed position of the handle arm 61 can be changed in the forward-backward direction by means of the bolts 64 and groove 62C. Furthermore, the main body 10 and handle unit 60 are positioned with respect to each other so that the entire assembly is well balanced, and can be easily carried by holding the handle leg 62B with one hand, i.e., in the manner that one might hold a typical tea kettle, with the handle leg 62B above the main body 10. Furthermore, an electric switch 70 (i.e., a manually operable switch) is positioned on top of the handle leg 62B for convenient operation by a user holding the handle leg 62B. The portions of the handle unit 60 intervening between the handle leg 62B and the main body 10 (i.e., portions extending down to the main body 10 including 62A, 61B, and 61A) may be considered a connection portion connecting the handle leg 62B and the main body 10.

The air cylinder 25 for driving the clamping unit 20, the air cylinder 36 for driving the cutting unit 30, and the air cylinder 50 for driving the mobile frame body 12 are each controlled by a control unit 100 (shown in FIG. 4) containing relay circuitry, which controls a compressed air supply 101 (shown in FIG. 4) independently connected to each of the air cylinders 25, 36, and 50 and able to drive each of the air cylinders 25, 36, and 50. The handle leg 62B of the handle unit 60 incorporates armature relay circuitry, and the air cylinders 25, 36, and 50 automatically carry out actuation (i.e., driving) of their respective driven members according to a finger operation (described later) of the electric (manually operable) switch 70 by a user holding the handle leg 62B.

Figure 4:
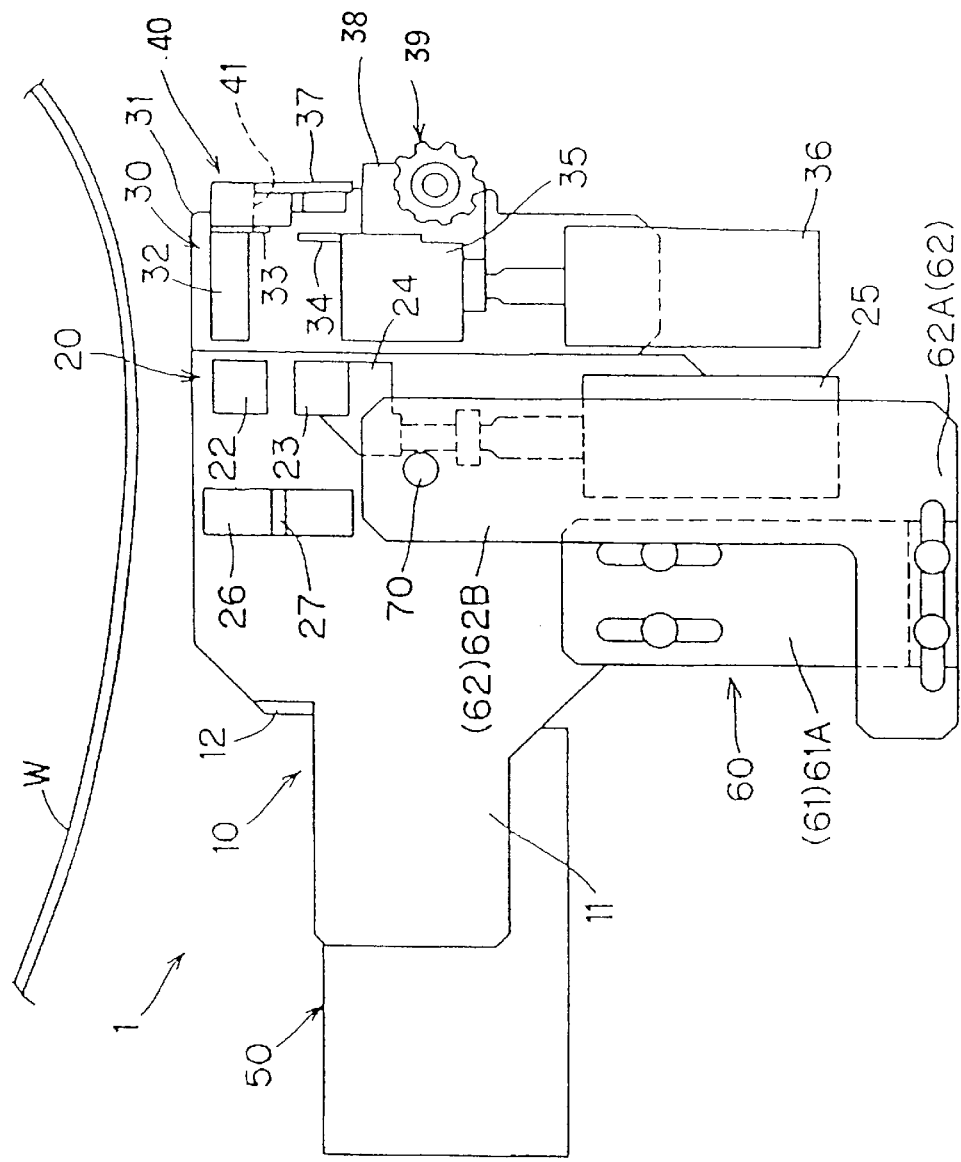
FIG. 4 is a plan view of the portable stripping unit in a first actuating step.

FIGS. 4 through 8 are plan views showing the actuating steps in the embodiment of FIG. 1. As shown in FIG. 4, the respective air cylinders 25, 36, and 50 extend and withdraw their respective plunger rods as they are controlled by the control unit (not shown). When the respective air cylinders 25, 36, and 50 are controlled to withdraw their respective plunger rods by the control unit, the clamps 22, 23 of the clamping unit 20 are opened by the air cylinder 25, the stripping blades 33, 34 of the cutting unit 30 are opened by the air cylinder 36, and mobile frame body 12 is drawn to the home position at the forward end of the fixed frame body by the air cylinder 50.

To carry the stripping unit to a desired location, the entire assembly is lifted (with one hand) by the handle unit 60 and carried. When at the desired location, for example, an operator may easily raise or lift a covered electric wire W from a wiring diagram board, place the main body 10 in the area under the wire W, and set the covered electric wire W between the clamps 22, 23 of the clamping unit and the stripping blades 33, 34 of the cutting portion in a setting position. Simultaneously, the operator may visually inspect the setting of the covered electric wire W.

Since the positioning member 40 has a substantially hook-shaped insertion hook 41 formed therein, once the covered electric wire W is raised or lifted (the main body 10 being placed in the area under the wire W), and inserted into the insertion hook 41, it is difficult for the covered electric wire W to become removed from the positioning member 40, and as a result, it is unlikely that the wire W will be detached from the setting position.

Before the covered electric wire W is set in the insertion hook, the rotatable adjusting wheel 39 is rotated to a selected angular position to set the cutting or stripping depth by selecting which of the projections 39E faces the protruding plate 37. The rotatable adjusting wheel 39 clicks into the selected position by virtue of the ball plunger 39B mounted in the extender plate 38. Accordingly, before the mobile blade holder 35 is moved, the adjusting wheel 39 sets a cutting depth (into the covered portion of the covered electric wire W) of the first and second stripping blades 33, 34. In this manner, the adjusting wheel 39 will contact the protruding plate 37 when the driving mechanism drives the opposing stripping blades 33, 34 toward each other.

Figure 5:
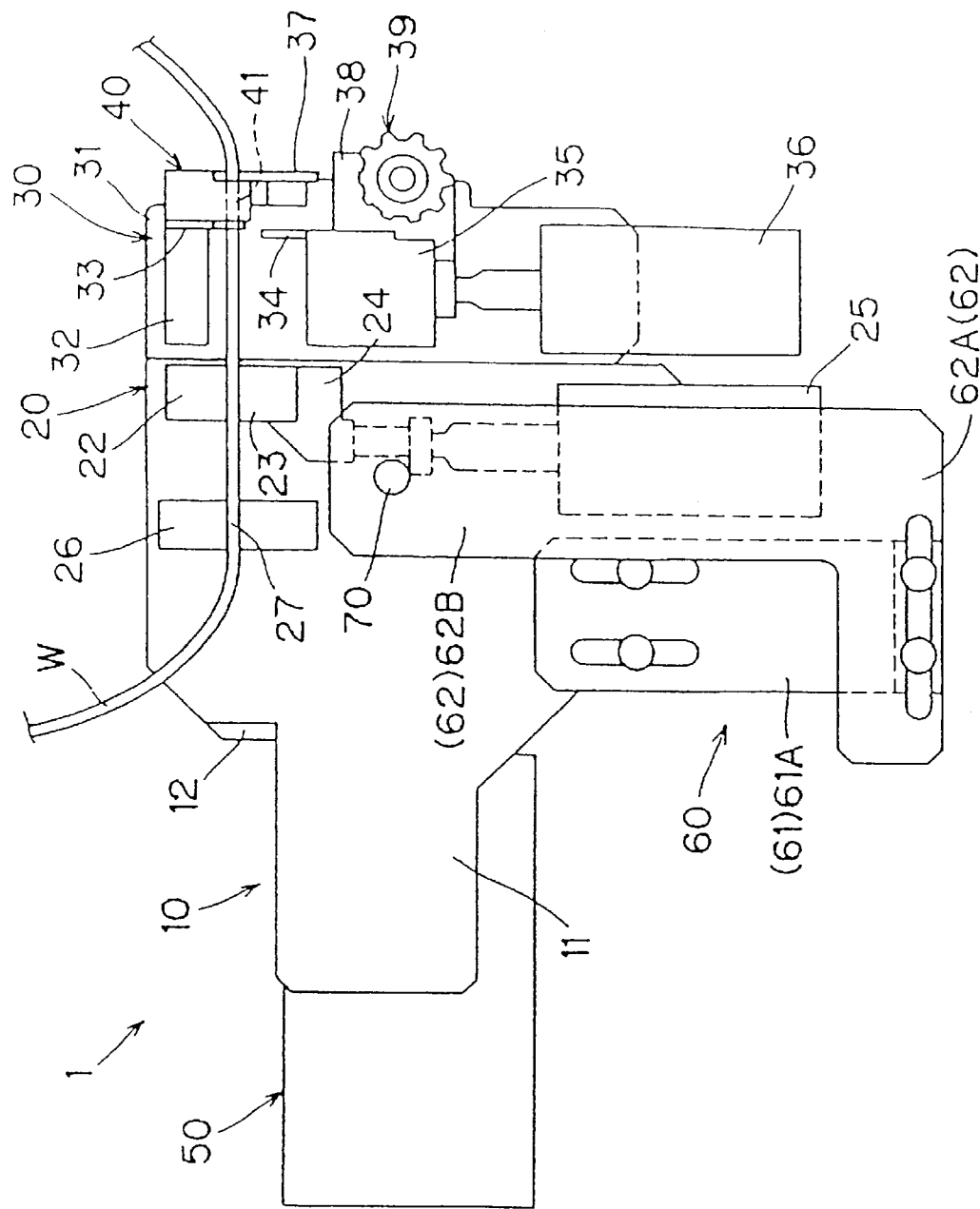
FIG. 5 is a plan view of the portable stripping unit in a second actuating step.
Figure 6:
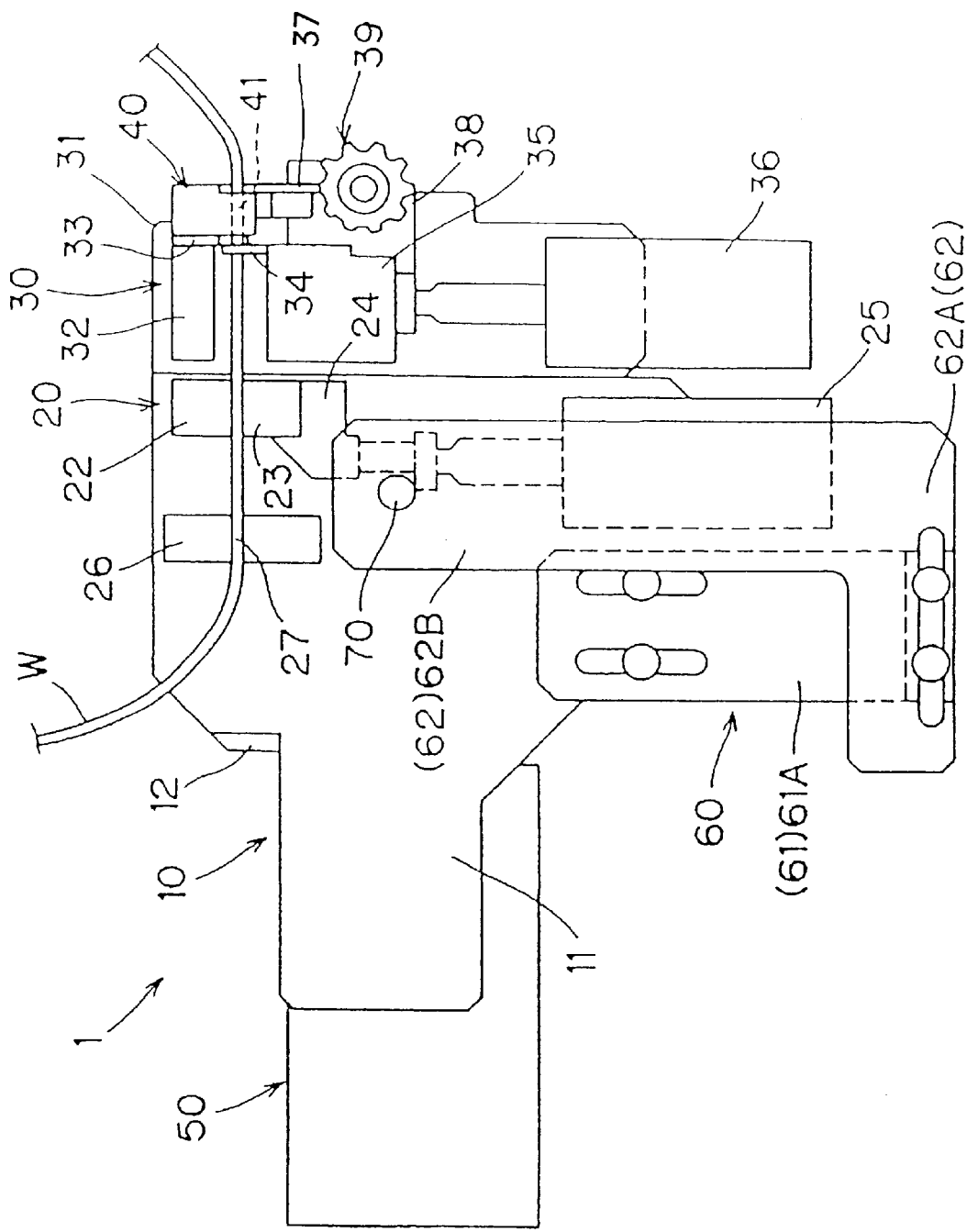
FIG. 6 is a plan view of the portable stripping unit in a third actuating step.

When the operator operates the electric switch 70 in the handle unit 60 after verifying that the covered electric wire W is properly set, the stripping unit changes to the state shown in FIG. 5. That is, as shown in FIG. 5, compressed air is first supplied to the air cylinder 25 of the clamping unit 20, upon which the mobile clamp 23 is driven toward the fixed clamp 22, and the covered electric wire W is nipped between the two clamps 22, 23. Subsequently, as shown in FIG. 6, compressed air is supplied to the air cylinder 36 of the cutting unit 30 after a predetermined time (for example, 3 seconds), moving the mobile blade holder 35 toward the fixed blade block 32, and the mobile side stripping blade 34 is driven toward the clamped covered electric wire W and the fixed side stripping blade 33. Consequently, the covered electric wire W is notched between the stripping blades 33, 34 when the air cylinder 36 of the cutting unit 30 is driven. The rotated position of the spiral perimeter of the adjusting wheel 39 (i.e., the selected projection 39E) determines the interval between the stripping blades 33, 34 at which the mobile blade holder 35 will stop, and thereby the depth of the cut.

Figure 7:
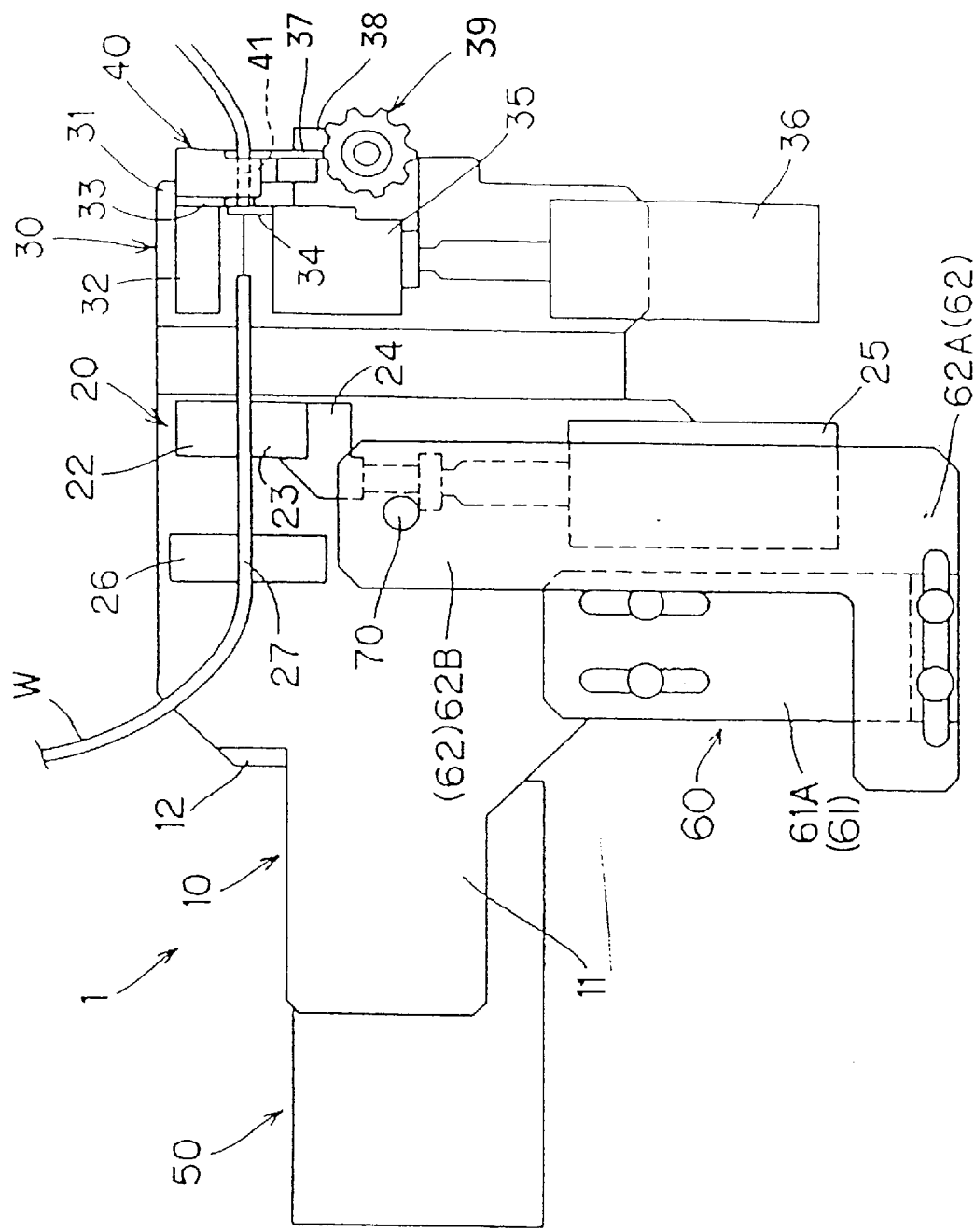
FIG. 7 is a plan view of the portable stripping unit in a fourth actuating step.

Subsequently, as shown in FIG. 7, the air cylinder 50 is supplied with compressed air, and drives the mobile frame body 12 in the forward direction so that it moves away from the forward side of the fixed frame body 11. The covered portion of the clamped covered electric wire W (by the clamping unit 20) and the covered portion of the unclamped electric wire W (i.e., the remaining portion of the wire W as pushed by the stripping blades 33, 34) move away from one another and are thereby mutually separated, accomplishing the intermediate stripping.

Figure 8:
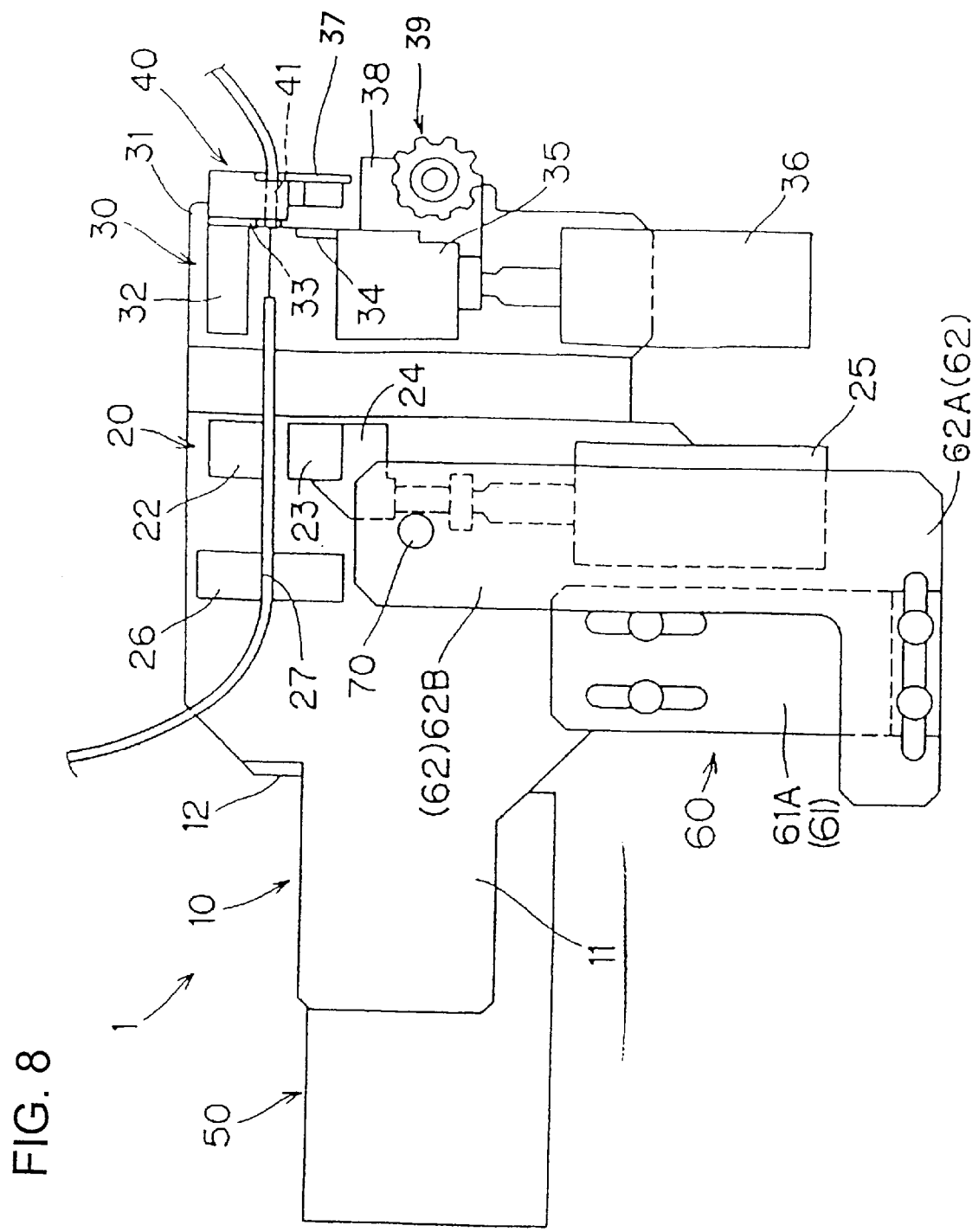
FIG. 8 is a plan view of the portable stripping unit in a fifth actuating step.

Finally, as shown in FIG. 8, the air cylinder 25 of the clamping unit 20, and the air cylinder 36 of the cutting unit 30 are driven to withdraw their respective plunger rods, and the clamps 22, 23 and the stripping blades 33, 34 are opened. The covered electric wire W (having been intermediately stripped) may then be removed from the insertion hook 41, the air cylinder 50 driven to withdraw its plunger rod 53, and one cycle of the intermediate stripping process is complete. At the end of the cycle, the intermediate stripping device returns to the state shown in FIG. 5.

Figure 9:
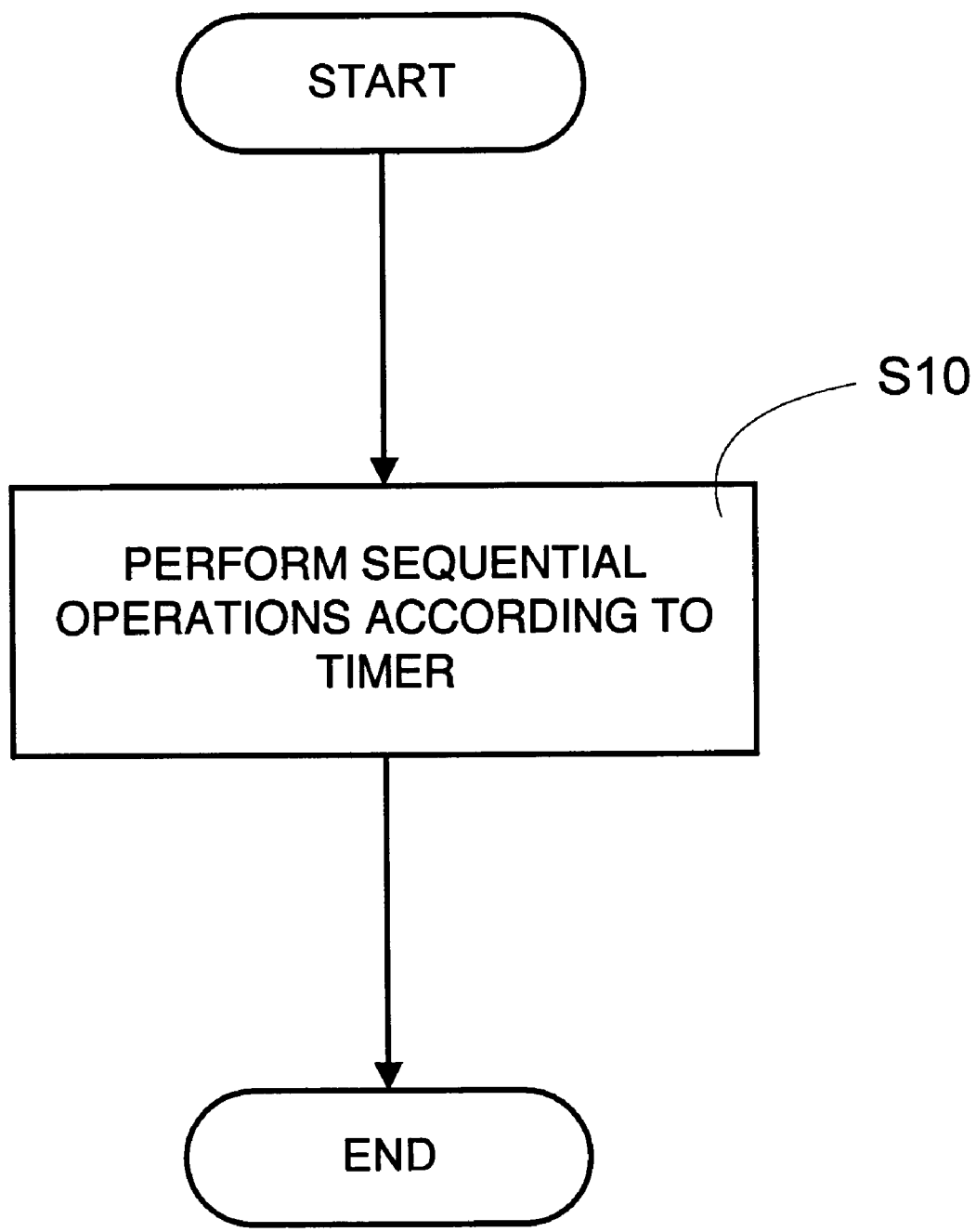
FIG. 9 is a flowchart showing an operation using a timer contained in a controller.
Figure 10:
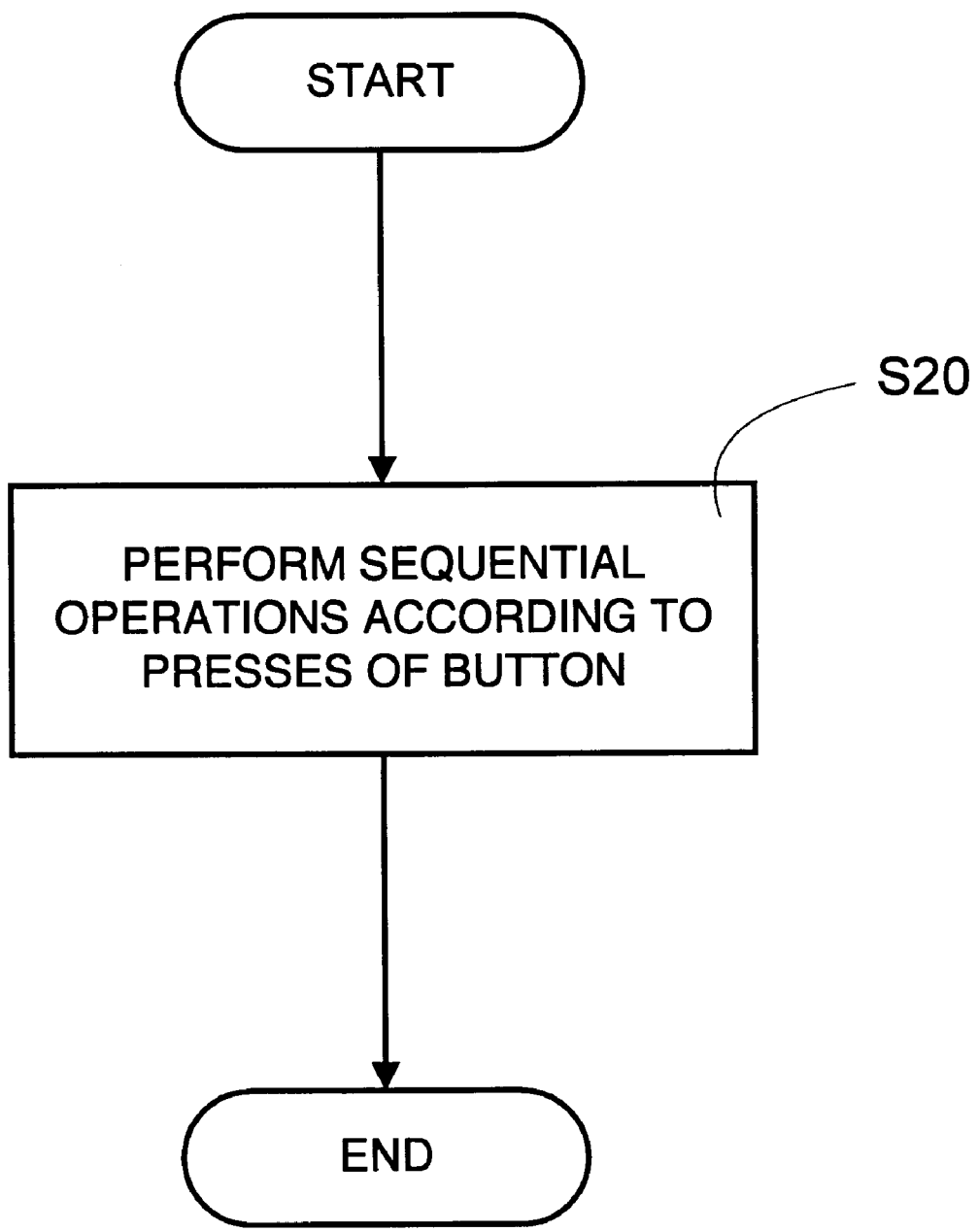
FIG. 10 is a flowchart showing an operation using successive operations of a button.

The control of the air cylinders 25, 36, and 50 is accomplished by providing a timer for timing control in the controller 100, or in the previously described relay control circuit (not shown). As shown in FIG. 9, the previously described operations are then performed suquentially according to the timer (S10). Alternatively, an operation and/or air cylinder cycle may be performed on a step-by-step basis for each press of the button (electric switch 70). As shown in FIG. 10, the previously described operations are then performed sequentially according to the button presses (S20).

As described, in the embodiment of the present invention, after the covered electric wire W (e.g., arranged to be wired on a design plate) is clamped by the clamping unit 20 and cut by the cutting unit 30, the intermediate stripping process is performed by driving the mobile frame body 12 so that the clamping unit 20 and the cutting unit 30 are separated from one another (performing the stripping) and returned (to be ready for a subsequent operation). Consequently, the invention has a clear effect of benefiting modern small lot manufacturing. That is, many different types of wires may be stripped in small quantity production lots.

Furthermore, as the cutting depth is easily adjusted by rotating the adjusting wheel 39 to an appropriate position, thereby limiting the interval between the mobile side stripping blade 33 and the fixed side stripping blade 34, the device is well suited for general purpose and flexible use. Advantageously, more kinds of wires and smaller quantities can be processed.

Still further, since the covered electric wire W may be raised from an assembly, observed, and set while the operator holds the device in kettle-fashion with one hand and the main body 10 placed in the area under the wire W, the main body 10 is stable, and workability is significantly enhanced. In addition, once a covered electric wire is raised from an assembly and set in the device, the positioning member securely holds the wire W in the insertion hook 41. Accordingly, the covered electric wire may be easily positioned and set even if an operator works by holding the handle unit 60 in one hand.

Although the above description sets out a particular embodiment of the present invention, modifications of the invention will be readily apparent to those skilled in the art, and it is intended that the scope of the invention be determined solely by the appended claims.

The present disclosure relates to subject matter contained in Japanese Application No. HEI 8-211521, filed on Aug. 9, 1996, which is expressly incorporated herein by reference in its entirety.

What is claimed is:

1. A portable stripping unit for stripping an intermediate portion of a covered electric wire, comprising:

a main body including two frame bodies having mutually changeable relative positions;

a handle unit fixed to one of said two frame bodies by which said portable stripping unit may be carried with one hand, a portion of said handle unit being positioned above said main body when said portable stripping unit is carried by an operator;

a clamping unit that clamps and retains the covered electric wire, provided to one of said two frame bodies;

a cutting unit that cuts a covered part of the covered electric wire, provided to a remaining one of said two frame bodies; and a driving mechanism provided to said main body, that drives said two frame bodies to separate from one another and approach one another, thereby driving said clamping unit and said cutting unit to separate from one another and approach one another to carry out intermediate stripping.

2. The portable stripping unit according to claim 1, wherein said cutting unit comprises:

a fixed member that holds a first stripping blade, fixed to said remaining one of said two frame bodies;

a mobile member that holds a second stripping blade, said fixed member and said mobile member having mutually changeable relative positions, and said mobile member moving with respect to said remaining one of said two frame bodies so that said first stripping blade and said second stripping blade become positioned to mutually cut said covered part of said covered electric wire; and a manually operable rotatable adjusting wheel directly rotatable by a user's hand provided to one of said mobile member or said fixed member, a position of said adjusting wheel determining an interval between said fixed member and said mobile member, so that when said mobile member is moved to position said first stripping blade and said second stripping blade to mutually cut said covered part of said covered electric wire, said adjusting wheel sets a cutting depth of said first stripping blade and said second stripping blade.

3. The portable stripping unit according to claim 2, wherein said handle unit is attached to said main body by a connecting portion at a side of said main body and a portion of said handle unit extends cantilevered from said connecting portion over said main body, such that a covered electric wire still attached to a circuit board may be raised, said main body may be inserted from a side of said covered electric wire in an area under said covered electric wire, and said covered electric wire may be set in said clamping unit and said cutting unit while said handle unit is substantially above said main body.

4. The portable stripping unit according to claim 2, further comprising:

a positioning member; and a substantially hook-shaped insertion hook, said positioning member and said insertion hook regulating said covered electric wire as said clamping unit and said cutting unit separate from one another to carry out intermediate stripping.

5. The portable stripping unit according to claim 1, wherein said handle unit is attached to said main body by a connecting portion at a side of said main body and a portion of said handle unit extends cantilevered from said connecting portion over said main body, such that a covered electric wire still attached to a circuit board may be raised, said main body may be inserted from a side of said covered electric wire in an area under said covered electric wire, and said covered electric wire may be set in said clamping unit and said cutting unit while said handle unit is substantially above said main body.

6. The portable stripping unit according to claim 5, further comprising:

a positioning member; and a substantially hook-shaped insertion hook, said positioning member and said insertion hook regulating said covered electric wire as said clamping unit and said cutting unit separate from one another to carry out intermediate stripping.

7. The portable stripping unit according to claim 1, further comprising:

a positioning member; and a substantially hook-shaped insertion hook, said positioning member and said insertion hook regulating said covered electric wire as said clamping unit and said cutting unit separate from one another to carry out intermediate stripping.

8. The portable stripping unit according to claim 1, said handle unit further comprising a handle leg extending over an upper surface of said main body and a connecting portion extending from said handle leg to said main body.

9. The portable stripping unit according to claim 8, wherein said handle leg is substantially L-shaped and both legs of the L-shape are substantially parallel to said upper surface of said main body.

10. The portable stripping unit according to claim 1, further comprising a connecting portion connecting said main body and said handle unit, and wherein said handle unit including a first cantilevered portion extending from said connecting portion and including a handle leg substantially at a distal end of the first cantilevered portion, said main body including a second cantilevered portion extending from said connecting portion in a same direction as, and parallel to, said first cantilevered portion, said cutting unit and clamping unit being substantially at a distal end of the second cantilevered portion.

11. The portable stripping unit according to claim 1, wherein said handle unit includes a handle leg substantially parallel to said main body, and wherein a first portion of said main body being below said handle unit, said cutting unit and clamping unit are mounted on a second portion of said main body extending from and cantilevered from said first portion of said main body.

12. A portable stripping unit for stripping an intermediate portion of a covered electric wire, comprising:

a connecting portion that connects a handle unit to a main body, the handle unit including a first cantilevered portion extending from said connecting portion and including a handle leg, substantially at a distal end of the first cantilevered portion, by which said portable stripping unit may be carried with one hand, and the main body including two frame bodies having mutually changeable relative positions, said main body including a second cantilevered portion extending from said connecting portion in a same direction as, and parallel to, said first cantilevered portion;

a clamping unit that clamps and retains a covered electric wire, provided to one of said two frame bodies;

a cutting unit that cuts a covered part of said covered electric wire, provided to a remaining one of said two frame bodies, said clamping unit and said cutting unit being positioned along a processing line, said second cantilevered portion being offset laterally from said processing line; and a driving mechanism that drives said two frame bodies to separate from one another and approach one another.

\* \* \* \* \*